March 8, 1966 K. L. BERGLUND 3,239,748

CONTROL APPARATUS

Filed Sept. 7, 1961

INVENTOR.

KENNETH L. BERGLUND

BY Roger W. Jensen

ATTORNEY

United States Patent Office 3,239,748
Patented Mar. 8, 1966

3,239,748
CONTROL APPARATUS

Kenneth L. Berglund, Largo, Fla., assignor to Honeywell Inc., a corporation of Delaware Filed Sept. 7, 1961, Ser. No. 136,643
1 Claim. (Cl. 323—23)

This invention pertains generally to amplifiers using thyratron type devices as output power switches. More specifically it pertains to the use of a non-oscillating regenerative amplifier supplying a signal to switch a solid state control rectifier. In one embodiment, this provides a high sensitivity temperature control amplifier in which large amounts of heater power can be controlled. Another feature of this invention is the way and manner in which the two silicon control rectifiers in the output stage are connected, when used in a full wave embodiment, so that the action of turning to an "on" condition by one rectifier will turn "on" the second rectifier on the following half cycle. With this feature, both rectifiers can be controlled with little additional circuitry from that required to control a single rectifier.

This invention is one example of a solution of the stringent weight requirements imposed upon today's aircraft equipment. The complete amplifier and silicon control rectifier package occupies less space than the entire glass envelope in a thyratron tube of a few years ago. This weight saving is of utmost importance when the application is in spacecraft.

It is an object of this invention to provide a high sensitivity power amplifier with a minimum of components.

Another object is to provide a new and novel concept in the way and manner the solid state rectifiers are switched to an "on" condition such that the signal from the amplifier can control both rectifiers while still providing full wave rectified power to the load.

A further object of this invention is to provide a temperature control amplifier in which large amounts of power can be provided for initial heating purposes and yet high sensitivity can be obtained after the desired temperature is reached to keep the environment at a very closely controlled temperature.

Figure 1:
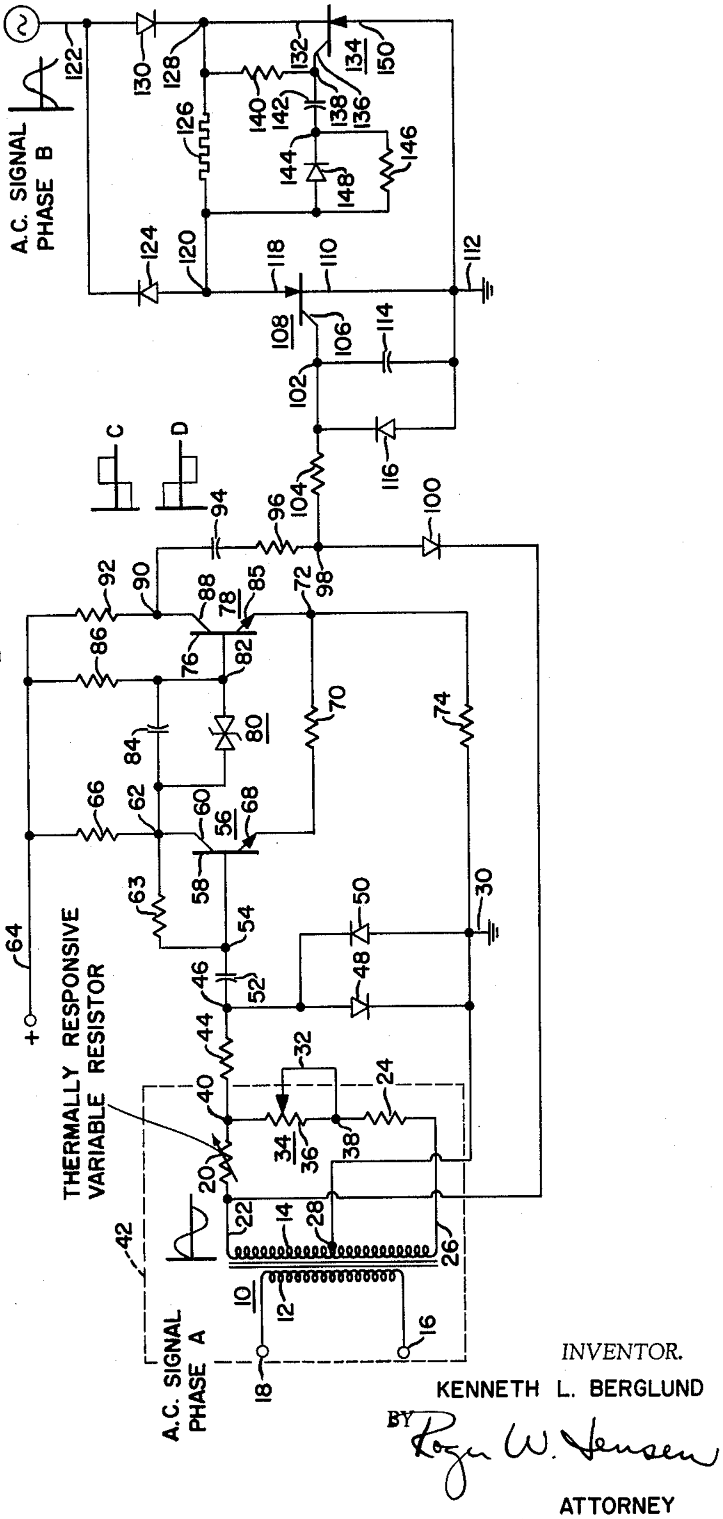
Figure 2:
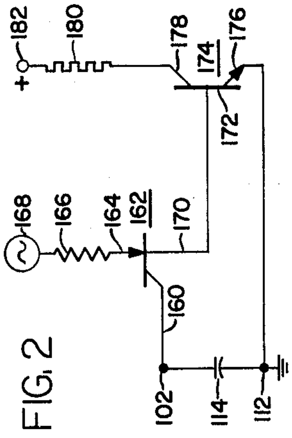

Other objects will be ascertained by referring to the specification and the appended claims, in conjunction with the figures in which:

FIGURE 1 is a circuit diagram of a full-wave embodiment of the invention to be described in the following paragraphs where a half-wave embodiment is substantially the same with less components being used; and FIGURE 2 is a switching output circuit used as an alternate embodiment in which the main power being used is supplied from a direct current source.

In FIGURE 1, a transformer 10 is shown with a primary winding 12 and a secondary winding 14. One end of the primary winding 12 is connected to an input terminal 16 and the other end is connected to an input terminal 18. One end of the secondary winding 14 is connected to one end of a thermally responsive variable resistor 20 by a lead 22. The other end of the secondary winding 14 is connected to one end of a resistance element 24 by a lead 26. A center tap 28 on the secondary winding 14 is connected to a reference voltage which for convenience is designated as ground 30. The other end of the resistance element 24 is connected to a junction point 38 and to a wiper 32 on a variable resistor 34. One end of a resistance element or winding 36 of the variable resistor 34 is also connected to the junction point 38. The other end of the resistance element 36 is connected to a junction point 40. The other end of the resistance element 20 is also connected to junction point 40. The center tap 28 and the junction point 40 compromise the inputs to an amplifier to be described in the following paragraphs. The transformer 10 and the resistance elements 20 and 24 along with the variable resistor 34 within the dashed lines comprise a bridge circuit 42. A resistance element 44 is connected between the junction point 40 and a junction point 46. A diode 48 is connected between the junction point 46 and ground 30. Another diode 50 is connected between the same two points. The two diodes 48 and 50 are connected in opposite directions so that the diode 48 provides current flow from 46 to ground 30 while the diode 50 provides current flow from the ground point 30 to the junction point 46. A capacitor 52 is connected between the junction point 46 and a junction point 54. An NPN transistor 56 has a base 58 connected to the junction point 54. A collector 60 of the transistor 56 is connected to a junction point 62. A resistor 63 is connected between the junction points 54 and 62. The junction point 62 is connected to a positive power terminal 64 through a resistance element 66. An emitter 68 of the transistor 56 is connected to ground through a resistance element 70, a junction point 72, and a resistance element 74. The junction point 62 is connected to a base 76 of an NPN transistor 78 through a double anode Zener diode 80 and a junction point 82. A capacitor 84 is also connected between the junction points 62 and 82. An emitter 85 of transistor 78 is connected to junction point 72. The junction point 82 is connected to the positive power supply terminal 64 through a resistor 86. A collector 88 of the transistor 78 is connected to a junction point 90. The junction point 90 is connected to the positive power supply terminal 64 through a resistor 92. The junction point 90 is also connected to lead 22 of transformer 10 through a series connection of a capacitor 94, a resistance element 96, a junction point 98, and a diode 100. The diode 100 is connected to permit current flow from junction point 98 to lead 22.

In a full wave embodiment of the circuit, a resistance element 104 is connected between the junction point 98 and a junction point 102. The junction point 102 is connected to a gate 106 of a control rectifier or thyratron type means 108. The rectifier 108 in most applications would be a silicon semiconductor although it need not necessarily be a solid state device. The term controlled rectifier means is therefore intended to include both solid state and tube type controlled rectifiers. The necessary circuit modifications in using these items will be apparent to those skilled in the art. A cathode 110 of the control rectifier 108 is connected to ground 112. Ground 112 may be the same as ground 30 if this is desired. A capacitor 114 is connected between the junction point 102 and ground 112. A diode 116 is also connected between junction point 102 and ground 112 to permit current flow from ground 112 to the junction point 102. An anode 118 of the control rectifier 108 is connected to a junction point 120. A diode or rectifier 124 is connected between an input power terminal 122 and the junction point 120. The junction point 120 is also connected to the input power terminal 122 through a heating element, load, or resistance element 26, a junction point 128, and a diode or rectifier element 130. The rectifier 124 is connected to provide current flow from the junction point 120 toward the input terminal 122 and the rectifier 130 is connected to allow current flow from the input terminal 122 toward the junction point 128. A cathode 132 of a second control rectifier or thyratron type means 134 is connected to the junction point 128. A gate 136 of the control rectifier 134 is connected to a junction point 138. A resistance element 140 is connected between the junction point 138 and the junction point 128. A capacitor 142 is connected between the junction point 138 and a junction point 144. A resistance element 146 is connected in parallel with a diode or rectifying element 148 and connected between the junction points 120 and 144.

The diode 148 is connected to provide current flow from the junction point 120 toward the junction point 144. An anode 150 of the control rectifier 134 is connected to ground 112.

The above paragraph describes the full wave version of this circuit. To produce a half wave version, all the elements from the number 130 and up, and the rectifier 124, must be removed from the circuit and the heating element 126 must be connected directly from anode 118 to the input terminal 122. The resulting circuit will be a half wave switching circuit for the control amplifier.

FIGURE 2 shows an alternate embodiment of the half wave version of the power switching circuit in which D.C. power can be used as the main source of current. The circuit of FIGURE 1 up to and including junction points 102 and 112 is the same as required for FIGURE 2 and has been omitted for convenience.

In FIGURE 2 junction point 102 is connected to a gate 160 of a control rectifier or thyratron type means 162. An anode 164 is connected to one end of a resistance element 166. The other end of the resistance element 166 is connected to an alternating current input terminal 168. The power applied to terminal 168 is phase shifted by the same amount as the power applied to terminal 122 in FIGURE 1 as compared with the input signal. A cathode 170 of the control rectifier 162 is connected to a base 172 of power transistor or switching means 174. An emitter 176 of the transistor 174 is connected to ground 112. A collector 178 of the transistor 174 is connected to one end of a heating element or load means 180. The other end of the heating element 180 is connected to a direct current power source 182. This embodiment of the amplifier can be used when there is a large or ready supply of direct current power but the supply of alternating power is limited.

OPERATION

An input signal is applied to the terminals 16 and 18. This input signal is an alternating signal of a first phase which can be conveniently designated as phase A. The two halves of the secondary winding 14 form two legs of the bridge 42. A signal appears between the junction point 40 and the junction point or center tap 28. To set up the bridge 42 for a particular temperature, the wiper 32 on the variable resistor 34 is adjusted so that on-off control of controlled rectifier 108 is obtained at the desired temperature. In the embodiment to be described the temperature sensitive resistor 20, which normally will be placed in or near the environment or component being regulated or controlled, has a positive coefficient of resistance with temperature, however, a negative temperature coefficient resistor could be used with very little change in design. Where the temperature sensitive resistor 20 has a positive temperature coefficient, it will be assumed that a signal of a phase shown above the transformer 10 will appear when the temperature on the controlled component or environment is below the temperature at which the bridge is set for output on-off control. If the temperature of the controlled element goes above the temperature setting of the bridge 42, the signal will decrease through null until it is 180° out of phase with that shown above the transformer 10. The diodes 48 and 50 will limit the voltage, which is applied by the bridge 42 to the base 58 of the transistor 56, to whatever the breakdown voltage of the diodes 48 and 50 happens to be. With many diodes this breakdown voltage is approximately .6 of a volt. These diodes constitute a safety device to prevent high voltages from being applied to the base 58 of transistor 56. High voltage spikes induce premature aging and occasionally destroy a transistor. In this specification the "on" condition of a semiconductor device is defined as the time when passage of current is allowed in a substantial quantity compared to the leakage current. A minimum amount of current flow is used in defining an "off" condition. Transistor 56 is normally biased in a class A condition and transistor 78 is normally in a full "on" condition. When a signal is applied to the base 58 of transistor 56 and the signal is going in the positive direction, the transistor 56 turns "on" to allow more current flow through the transistor and to lower the voltage to the junction point 62. As the voltage at junction point 62 is lowered, the voltage at the base 76 of transistor 78 is also lowered through the action of the capacitor 84 which has been charged up to a voltage determined by the potential difference between the quiescent collector voltage of transistor 56 and the voltage at junction point 82. As the voltage at junction point 62 is lowered, the base current for transistor 78 is diverted through capacitor 84 and transistor 56. When the base current of transistor 78 is reduced sufficiently, transistor 78 starts turning to an "off" condition and the voltage at the emitter 85 of the transistor 78 is lowered thereby turning the transistor 56 further towards the "on" condition. This provides positive or regenerative feedback to turn transistor 56 full "on" and to turn transistor 78 to an "off" condition. The regenerative action provides a large output signal for a very small change in input signal and thus provides very great sensitivity with only two transistors. If the environment in which the bridge 42 is placed is lower than the temperature to which the bridge 42 is set, a voltage with the phase characteristics compared with a time reference shown at D will be observed at junction point 90. If the environment is of a higher temperature than the setting of the bridge 42, a signal of the phase characteristic with respect to the signal B such as shown at C will appear at junction point 90. However, a finite region exists just above the temperature setting of the bridge in which no signal will be observed at junction point 90 due to the fact that the saturation of transistor 78 requires a finite signal level at the input point 46 before the transistor 78 will be turned to an "off" condition.

If it is assumed that the temperature of the controlled component is lower than the setting of the bridge 42 the signal shown as D will appear at junction point 90. The voltage at lead 22 of the secondary 14 is also positive at the same time the voltage appearing at junction point 90 is positive. Since both lead 22 and junction point 90 are positive, the junction point 98 will follow the voltage of junction point 90 and a control pulse or voltage will be applied to the gate 106 of the control rectifier 108. This voltage will be applied across the cathode to gate junction of controlled rectifier 108. At the beginning of the control pulse, the voltage which is applied at terminal 122 will be negative since it is phase shifted and lags the signal appearing at the input of the transformer 10 by a predetermined amount. In one embodiment of this invention, the lag of the voltage applied to terminal 122 was in the range of 90° to 120°. Since the signal appearing at the gate 106 is leading the voltage which is applied through the rectifier 130 and the heater 126 to the anode 118 of the control rectifier 108, the control rectifier 108 will not turn to an "on" condition upon the application of an input pulse to gate 106 since the anode 118 is negative with respect to the cathode 110. After the positive voltage pulse is applied to gate 106, the anode starts in a positive direction with respect to the cathode. The phase relationship of the gate and anode voltage depends upon the amplitude of the input signal from the bridge 42. The voltage signal shown as phase B, which is applied to terminal 122, can be seen in its phase relationship to the phase A signal applied to the transformer 10. When the anode 118 goes in the positive direction, at the same instant that a positive gate signal is applied, the control rectifier 108 is turned to an "on" condition. Later in the cycle the preamplifier, composed of transistors 56 and 78, no longer has an input signal of sufficient magnitude to keep transistor 78 from returning to its saturated operating point and reverts back to the original condition. The control rectifier 108 however, does not turn "off" merely because an input signal is no longer applied to the gate 106. The rectifier 108 will continue conducting until it is again reverse biased. In a half wave embodiment, only the components mentioned this far in the operation of the circuit will be required. The diode 116 prevents reverse bias of greater than the forward voltage drop of the diode from being applied to the gate 106 with respect to the cathode 110 due to the current flow from ground through the diode 116, resistance element 104, the diode 100 and to the lead 22 of the transformer 10 for a portion of each cycle. When the required temperature is reached the circuit input signal is no longer sufficient to drive transistor 78 out of its saturated operation region therefore no signal is applied to the control rectifier 108 while the anode 118 is positive to apply power to the heater 126. It can be seen therefore that the control rectifier is either turned on for a full half cycle or else not turned on at all. The advantage to having a control rectifier turn on at the beginning of a half cycle is that there is no switching transient containing high frequency signals in the line power to generate noise or create disturbances on the line. Disturbances would be created if the control rectifier 108 were turned "on" at various points in the positive half cycle of the power waveform. To control power in the method or manner described herein will produce minimum disturbance on the power line characteristics. This is very important in applications where sensitive equipment is operating. One piece of sensitive equipment in particular is a gyro heated by this temperature control amplifier. The gyro can be caused to drift or get off balance because of line disturbances created by switching transients.

If the temperature of the controlled element becomes greater than the temperature at which the bridge 42 is set by a sufficient amount, a signal 180° out of phase from that originally assumed will appear to the input of the preamplifier and the signal shown as C will be obtained at the junction point 90. For the first 180° in the cycle, the junction point 90 will be only slightly positive with respect to ground and the control rectifier 108 will be left in the "off" condition. When the junction point 90 starts in the positive direction, the lead 22 on the secondary 14 will be starting in the negative direction. This brings the point 98 down in voltage as long as current is flowing through the diode 100. As the impedance to ground 30 from junction point 98 through diode 100 and the transformer secondary is much less than the resistance of resistor 96 the voltage developed at junction point 90 is dropped across resistor 96 and the junction point 98 will be held at a negative potential with respect to ground. The control rectifier 108 will be left in the "off" condition even though a positive signal appears at the junction point 90 and the anode 118 is held positive with respect to cathode 110. If the signal applied to the primary 12 of the transformer 10 is not phase shifted with respect to the voltage applied to terminal 122, the small amount of delay time for the preamplifier to turn off after an input signal is reversed in polarity can be enough to turn the control rectifier 108 to an "on" condition just as the power signal changes in polarity to make terminal 122 positive with respect to ground 112. This means that the control rectifier 108 under these conditions may allow current flow through the heater 126 even when it is not desired. By phase shifting the input signal with respect to the power signal this problem is solved.

When the amplifier is used with a full wave output as shown in FIGURE 1, the rectifier 108 is initially switched to an "on" condition by the preamplifier and a voltage drop is thereby produced across the heater element 126. This voltage drop allows a current through resistors 140 and 146 to charge up the capacitor 142 to a value determined by capacitor 142 and resistors 146 and 140 along with the load 126. As long as terminal 122 is positive with respect to ground 112 and current is flowing through the control rectifier 108, the control rectifier 134 is reverse biased and is not able to switch to an "on" condition. At the time the voltage applied across control rectifier 108 is reduced to zero and the terminal 122 starts going in the negative direction with respect to ground 112, a positive gate 136 to cathode 132 voltage is applied by capacitor 142 through its discharge circuit of load 126, diode 148 and the gate to cathode circuit of control rectifier 134. This immediately turns or switches the control rectifier 134 to an "on" condition to allow current flow from ground 112 through control rectifier 134 to the input power terminal 122 through the heater element 126 and the rectifier 124. During the period rectifier 134 is switched to an "on" condition, current flow is allowed from gate 136 to cathode 132 through the heater element 126 and the diode 148. If rectifier 108 has not fired on the previous half cycle, capacitor 138 will have discharged completely and rectifier 134 will not fire. Since current must flow through the heater element 126 on the previous half cycle in order to charge up the capacitor 142 sufficiently to fire the control rectifier 134 it can be seen that control rectifier 134 will only turn on after current has been allowed to pass through control rectifier 108. It can be seen that if the control rectifier 134 is going to switch to an "on" condition it will switch at the beginning of a half cycle and thus produce minimum disturbance on the line conditions in the same manner in which the control rectifier 108 is switched to an "on" condition.

From the above discussion it can be determined that the control rectifiers 108 and 134 will be turned "on" when there is a call for more heat for two successive half cycles of current or else not turned on at all. With the control rectifiers operated in this manner, there will be a minimum of dissipation produced since the control rectifier is either off for the full half cycle or is on for the full half cycle and there is no burst of current such as would be obtained if the control rectifiers were turned on at a point around the 90° or maximum voltage point in a half cycle. A circuit which is designed as shown in FIGURE 1 will thus produce full power for maximum heating until the controlled element is brought up to the required temperature and then will turn on for two or more successive half cycles and stay off for several full cycles until the operating temperature becomes low enough to warrant more successive half cycles of current to be passed through the heater 126 in the full wave version. In the half wave version or embodiment, current will be passed through the heater 126 in half cycle pulses whenever the operating temperature becomes low enough to warrant more power being applied to the heating element 126.

In FIGURE 2, when the signal applied to terminal 168, which is the same phase as the signal applied to terminal 122 in FIGURE 1, goes in the positive direction, at the same time a control pulse is being applied to the gate 160, the control rectifier 162 will turn to an "on" condition and allow current flow through the resistance element 166, the control rectifier 162, and the base 172 of the transistor 174. Current flow through the base of transistor 174 will turn the transistor 174 to an "on" condition and allow current to flow from the direct current source through the heating element 180 to supply heat to the controlled element. The transistor 174 can be turned "off" and "on" in contradistinction to the control rectifier element 162 which will only turn "off" when it is reverse biased. The transistor 174 will in this way supply alternating power to the heating element 180. The transistor 174 will turn "on" for half-cycle periods of the phase B signal and turn "on" for half-cycle periods of the phase B signal and turn "on" for only enough periods to bring the controlled element up to the required temperature. This adaptation of the circuit in FIGURE 1 can be used where a large supply of direct current power is available and a limited quantity of alternating current power is available since the power required to turn the transistor 174 to an "on" condition is much less than that required to bring the controlled element up to the proper temperature through heat dissipation from the heating element 180.

To practice the invention either negative or positive temperature coefficient resistors can be used for the sensing element 20 if temperature is to be measured. Any other condition sensing circuit can be used in which the input signal applied to a preamplifier is phase shifted and leading the power signal, that is applied to the control rectifiers, by a predetermined amount. The transistors in the drawing are shown as NPN transistors but it can be seen that PNP transistors or any other type of electron device from which a high gain amplifier can be built is useable in this invention. Although solid state rectifiers are shown in the drawing, it is to be understood that, although the weight will be increased, other devices such as thyratrons can be used where weight is of a lesser importance.

While the principles of the invention have been described above in connection with a given embodiment, it is to be clearly understood that this description is made only by way of example and not as a limitation on the scope of the invention. It is intended that all modifications hereto foreseeable to those skilled in the art be included and that this invention be restricted only by the following claim.

I claim:

Apparatus of the class described comprising, in combination: condition sensing means adapted to provide an output signal which varies in sense and amplitude with changes in a condition; means for applying an alternating signal of a first phase to said sensing means; non-oscillating regenerative amplifier means connected to receive said output signals from said sensing means and adapted to produce output control signals; first and second controlled rectifier means each including first output; second output, and control means, said control means of said first controlled rectifier means connected to receive said output control signals; load means connected between said first output means of said first controlled rectifier means and said second output means of said second controlled rectifier means; alternating power signal means for supplying a power signal of a second phase; first rectifying means connected between said first output means of said first controlled rectifier and said power signal means to block current flow from said power signal means to said input means of said first controlled rectifier means; second rectifier means connected between said power signal means and said second output means of said second controlled rectifier means to block current flow from said output means of said second controlled rectifier means to said power signal means, said first and second rectifier means operating to constrain the current flow to be through said load means; first and second resistive means; capacitive means, said capacitive means and said first and second resistive means being connected in a serial circuit across said load means, said first resistive means being further connected between said second output means and said control means of said second controlled rectifier means; and third rectifier means connected across said second resistive means to provide a low impedance path for charging said capacitive means.

References Cited by the Examiner

UNITED STATES PATENTS

| | | | |
|---|---|---|---|
| 2,510,041 | 5/1950 | Rudahl | 323—40 X |
| 2,693,572 | 11/1954 | Chase | 323—40 X |
| 2,717,352 | 9/1955 | Ribner | 323—23 X |
| 2,717,382 | 9/1955 | Ribner | 323—23 X |
| 2,952,762 | 9/1960 | Williams et al. | 219—499 |
| 2,954,470 | 9/1960 | Brashear | 323—68 X |
| 2,984,470 | 9/1960 | Brashear | 323—68 X |
| 3,042,781 | 7/1962 | Bray | 219—499 |
| 3,042,782 | 7/1962 | Bray | 219—499 |
| 3,043,965 | 7/1962 | Scarbrough et al. | 330—26 |
| 3,051,815 | 8/1962 | Hukee et al. | 219—499 |
| 3,098,920 | 7/1963 | Bray | 219—499 |
| 3,106,684 | 10/1963 | Luik | 330—26 |
| 3,113,198 | 12/1963 | Shinn | 219—499 |
| 3,155,777 | 11/1964 | Owen | 307—88.5 |
| 3,159,737 | 12/1964 | Dora | 219—499 |

OTHER REFERENCES

Controlled Rectifier Manual G.E.: March 21, 1960, pp. 64, 90–91, 92, 109–110.

Magnetic Amplifier Trigger Silicon Controlled Rectifiers, Electrical Design News, June 1959, pp. 20–21.

LLOYD McCOLLUM, *Primary Examiner.*

G. P. HASS, Jr., D. L. RAE, *Assistant Examiners.*